(12) United States Patent
Siciak et al.

(10) Patent No.: US 6,763,737 B2
(45) Date of Patent: Jul. 20, 2004

(54) AUTOMOBILE TRANSMISSION RANGE SENSOR SYSTEM

(76) Inventors: Raymond C. Siciak, Ann Arbor, MI (US); Bradley Dean Riedle, Northville, MI (US)

( * ) Notice: Subject to any disclaimer, the term of this patent is extended or adjusted under 35 U.S.C. 154(b) by 0 days.

(21) Appl. No.: 09/683,565

(22) Filed: Jan. 18, 2002

(65) Prior Publication Data

US 2003/0136210 A1 Jul. 24, 2003

(51) Int. Cl.[7] ............................................. F16H 59/00

(52) U.S. Cl. ....................................................... 74/335

(58) Field of Search ............................. 74/335, 473.15, 74/473.3, 473.12; 701/62, 63, 14; 340/456

(56) References Cited

U.S. PATENT DOCUMENTS

| | | | | |
|---|---|---|---|---|
| 5,399,965 A | * | 3/1995 | Heberle | 324/117 |
| 5,621,317 A | * | 4/1997 | Wozniak | 74/473.12 X |
| 5,758,304 A | * | 5/1998 | Bray | 74/335 X |
| 5,977,496 A | * | 11/1999 | Halberg et al. | 200/61.88 |
| 6,205,874 B1 | * | 3/2001 | Kupper et al. | 74/335 |
| 6,550,351 B1 | * | 4/2003 | O'Reilly et al. | 74/335 |

* cited by examiner

*Primary Examiner*—Roger Pang

(57) ABSTRACT

A non-contacting transmission range sensor system, which includes a control device, is disclosed. The system includes a shaft coupled to the control device. A non-contacting range sensor, coupled to the shaft, generates a pulse-width modulated signal in response to rotation of the shaft. A control module, electrically attached to the non-contacting range sensor, is subject to receive the pulse-width modulated signal.

10 Claims, 1 Drawing Sheet

AUTOMOBILE TRANSMISSION RANGE SENSOR SYSTEM

BACKGROUND OF INVENTION

1. Technical Field

The present invention relates generally to sensor systems and more particularly to transmission sensor systems.

2. Background of the Invention

It is well known that transmissions are assemblies that include speed-changing gears and propeller shafts through which power is transmitted from automobile engines to live axles. It is also well known that transmissions are capable of shifting to a selected speed range or vehicle operation. Smooth transition from one speed range or vehicle operation to another is facilitated through transmission range sensor systems.

Current Digital Transmission Range Sensors (DTRS) utilize a set of fixed four-bit patterns to indicate each angular position that the rooster comb/manual shaft has been placed into. For example, "0000" indicates the Park position, "0010" indicates the transition zone between the Park position and the Reverse position, and "0011" indicates the Reverse position, etc. The transition zone bit patterns were allocated because tooling tolerances did not allow a direct change from the bit pattern of one of the manual shaft positions directly to that of the next. Resultantly, transition zones were defined as error states in software indicating a misadjusted shifter, transmission range sensor, or rooster comb system. When the operator left the shifter in a position where the detent spring rested on a peak of the rooster comb, a Powertrain Control Module (PCM) error code was set. This resulted in a false malfunction signal, which interfered with proper PCM functioning. To remedy this, the transition zones were changed from error states to manual shaft positions (PRNDL) through additional software. With this approach, though, the hydraulic positions of the manual valve did not align precisely with those of the DTRS, which necessitated narrowing of the transition zones.

An additional difficulty experienced by current DTRS systems is that they use contacting type sensors, which are subject to contact wear. As the contacts wear, fretting corrosion tends to occur which results in erroneous sensor outputs.

The disadvantages associated with these transmission range sensor systems have made it apparent that a new transmission range sensor system is needed. This new system should facilitate transition from one vehicle operation to another. The new system should also substantially reduce the likelihood of fretting corrosion errors.

SUMMARY OF INVENTION

It is an object of the present invention to provide an improved transmission range sensor system. It is also an object of the present invention to provide an improved transmission range sensor system for applications that include automobiles.

In accordance with the present invention, a non-contacting transmission range sensor system, which includes a control device, is disclosed. The system further includes a shaft coupled to the control device. A non-contacting range sensor, coupled to the shaft, generates a pulse-width modulated signal in response to rotation of the shaft. A control module, electrically attached to the non-contacting range sensor, is adapted to receive the pulse-width modulated signal.

Additional objects and features of the present invention will become apparent upon review of the drawings and accompanying detailed description of the preferred embodiments.

BRIEF DESCRIPTION OF DRAWINGS

For a more complete understanding of the invention, there will now be described some embodiments thereof, given by way of example, reference being made to the accompanying drawings, in which:

FIG. 3 is a logic flow diagram of the operation of a non-contacting transmission range sensor system according to one embodiment of the present invention.

Referring to FIG. 1 and FIG. 2, a non-contacting transmission range sensor system 10, in accordance with one embodiment of the present invention, is illustrated. The system includes a control device, here illustrated as a user operated gearshift 12. The gearshift 12 is a typical rooster comb gearshift. Rooster comb gearshifts have a series of detent valleys, for the different gear positions, and detent peaks to separate the different gear positions. For example, for the gearshift 12 to move from the detent valley park position to the detent valley reverse position, it must travel over the detent peak between the park and reverse positions. The system further includes a transmission manual shaft arm 16 (transmission shaft) coupled to the control device. This (transmission) manual shaft 16 transfers the gearshift signal to the main transmission shaft 17 through transmission components 13 located on the transmission 18. The main transmission shaft 17 is internally coupled to the transmission 18 and responds to the gearshift signal by rotating relative to the position of the gearshift 12.

DETAILED DESCRIPTION

The present invention is illustrated with respect to a non-contacting transmission range sensor system 10, particularly suited to the automotive field. However, the present invention is applicable to various other uses that may require range sensor systems, such as steering systems, as will be understood by one skilled in the art.

Figure 1:
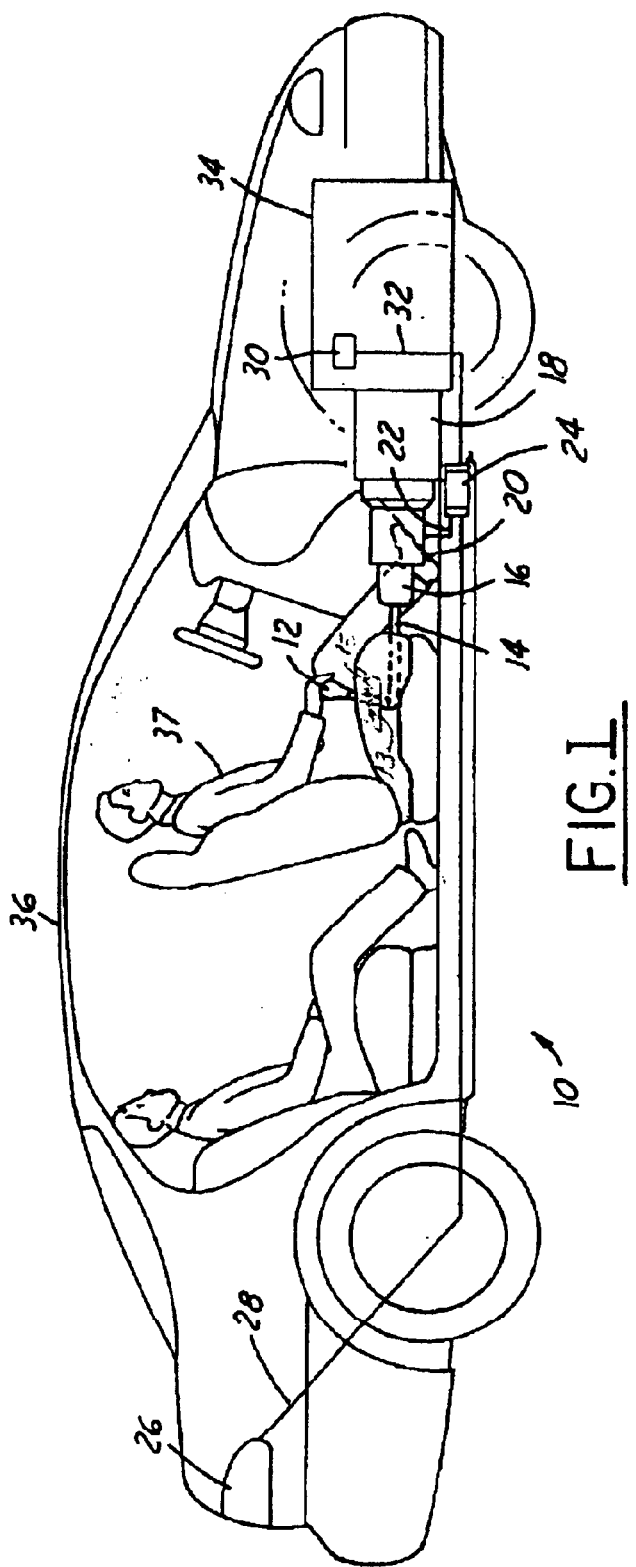
FIG. 1 is a side view of a non-contacting transmission range sensor system according to one embodiment of the present invention.
Figure 2:
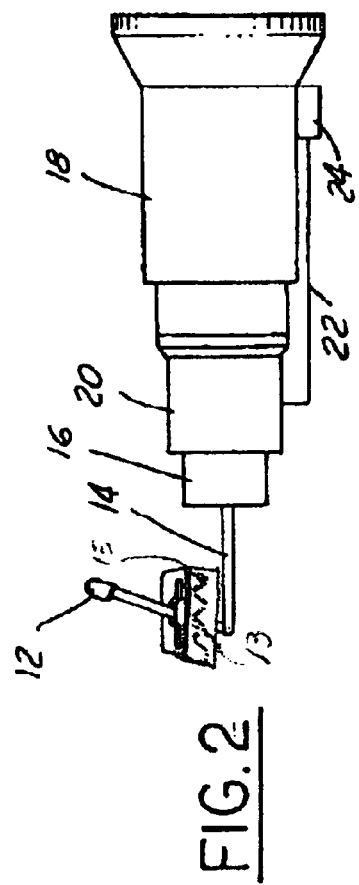
FIG. 2 is a component view of a transmission system.

Referring to FIG. 1 and FIG. 2, a non-contacting transmission range sensor system 10, in accordance with one embodiment of the present invention, is illustrated. The system includes a control device, here illustrated as a user operated gearshift 12. The gearshift 12 is a typical rooster comb gearshift. Rooster comb gearshifts have a series of detent valleys 13, for the different gear positions, and detent peaks 15 to separate the different gear positions. For example, for the gearshift 12 to move from the detent valley park position to the detent valley reverse position, it must travel over the detent peak between the park and reverse positions. The system further includes a torque transfer arm 14 coupled to the control device. This torque transfer arm 14 transfers the gearshift signal to the shaft, which is coupled to the torque transfer arm 14. In the current embodiment, the shaft is illustrated as a transmission shaft 16. The transmission shaft 16 is rotatably coupled to the transmission 18 and responds to the gearshift signal by rotating relative to the position of the gearshift 12.

A non-contacting range sensor, coupled to the transmission shaft 16, generates a continuous pulse-width modulated signal in response to rotation of the transmission shaft 16. In the current embodiment, the non-contacting range sensor is a non-contacting transmission range sensor 20. The non-contacting transmission range sensor 20 outputs a continuous pulse-width modulated percent duty cycle, which varies in a proportional relationship with the angular position of the gearshift 12. To clarify, the percent duty cycle is calculated by the following formula:

$$\% \text{ Duty Cycle} = 100 \left( \frac{\text{Rising Edge Time}_2 - \text{Falling Edge Time}}{\text{Rising Edge Time}_2 - \text{Rising Edge Time}_1} \right)$$

Optimally, the percent duty cycle is calculated from a substantially square pulse wave, as will be understood by one skilled in the art. Rising Edge Time$_2$ refers to the length of time necessary for the rising edge of a second pulse in the continuous pulse wave to reach the peak of the second pulse. Falling Edge Time refers to the length time necessary for the falling edge of the first pulse in the continuous pulse wave to reach the trough of the first pulse. Rising Edge Time$_1$ refers to the length of time necessary for the rising edge of the first pulse in the continuous pulse wave to reach the peak of the first pulse. The aforementioned formula generates a robust system design because the data is read in reference to "time" and not critically dependent on signal amplitude or frequency, which can be distorted through fretting corrosion. In the current embodiment, the percent duty cycle ranges from approximately 14% to approximately 87%. The non-contacting transmission range sensor 20 is also ideally resistant to electromagnetic (EM) interference. This is desirable because excessive EM interference tends to distort operations sensed by the non-contacting transmission range sensor 20. EM shielding is typically achieved by use of EM resistant materials or EM shielding, as will be understood by one skilled in the art.

The control module is electrically attached to the non-contacting transmission range sensor 20 through a control module wire 22 and is subject to receive the pulse-width modulated signal, as will be understood by one skilled in the art. The control module wire 22 is a standard automotive wire that is capable of sending a signal from the control module to the non-contacting transmission range sensor 20. In the current embodiment, the control module is a powertrain control module 24. The powertrain control module 24 is electrically coupled to the reverse lamps 26 through a reverse lamps wire 28, which is a standard automotive wire capable of sending a signal from the powertrain control module 24 to the reverse lamps 26. The powertrain control module 24 is further electrically coupled to the transmission solenoid 30 through the solenoid wire 32, which is a standard automotive wire capable of sending a signal from the powertrain control module 24 to the transmission solenoid 30. The powertrain control module 24 is still further electrically coupled to the engine 34, and the engine 34 is coupled to the vehicle 36, as will be understood by one skilled in the art.

The powertrain control module 24 operates with discrete duty cycle values set for components subject to control from the powertrain control module 24. As an illustrative example, when the percent duty cycle is between approximately 14% and 25%, the powertrain control module 24 is signaled that the gearshift 12 is in park. When the percent duty cycle is between approximately 25% and 38%, the powertrain control module 24 is signaled that the gearshift 12 is in reverse. When the gearshift 12 is signaled to operate in reverse, the powertrain control module 24 signals the reverse signal lamps 26 to activate. When the percent duty cycle is between approximately 38% and 48%, the powertrain control module 24 is signaled that the gearshift 12 is in neutral. When the percent duty cycle is between approximately 48% and 58%, the powertrain control module 24 is signaled that the gearshift 12 is in drive. When the percent duty cycle is between approximately 58% and 68%, the powertrain control module 24 is signaled that the gearshift 12 is in manual-third. When the percent duty cycle is between approximately 68% and 79%, the powertrain control module 24 is signaled that the gearshift 12 is in manual-second. When the percent duty cycle is between approximately 79% and 87%, the powertrain control module 24 is signaled that the gearshift 12 is in manual-first. The discrete duty cycle values ideally include set error state values, which indicate non-contacting transmission range sensor 20 malfunction. In the current invention, the set error state values are from 0% to 14% and from 87% to 100%.

In operation, using the embodiment in FIG. 1 and FIG. 2 to illustrate, a operator 37 of the vehicle 36 starts the transmission range sensor system 10 by manually operating the gearshift 12 to generate a gearshift signal, as will be understood by one skilled in the art. Subsequently, the transmission shaft 16 rotates in response to the gearshift signal. This rotation is sensed by the non-contacting transmission range sensor 20, which responds by generating a pulse-width modulated signal. The powertrain control module 24 then responds to the pulse-width modulated signal and sends signals to the respective vehicle functions desired by the operator 37. Common functions to which the powertrain control module 24 sends signals are the reverse signal lamps 26, vehicle crank in the engine 34, and the transmission solenoid 30, as will be understood by one skilled in the art.

Referring to FIG. 3 in view of FIGS. 1 and 2, a logic flow diagram 38 of the operation of a transmission range sensor system 10, in accordance with one embodiment of the present invention, is illustrated. The transmission range sensor system 10 is responsive to a gearshift command. The logic starts by inputting the gearshift command. After the start of the logic flow diagram 38 shown in FIG. 3, operation block 40 becomes active, and a gearshift signal is generated based on the gearshift command, as will be understood by one skilled in the art. Subsequently, operation block 42 becomes active, and the non-contacting transmission range sensor reads the gearshift signal, as discussed earlier. Following operation block 42, operation block 44 becomes active, and a pulse-width modulated wave form is generated by the non-contacting transmission range sensor based on the gearshift data. Operation block 46 then becomes active and the powertrain control module 24 interprets the pulse-width modulated wave form for preset duty cycle values, in accordance with equation (1) above as discussed earlier. Following operation block 46, a check is made in inquiry block 48 as to whether the percent duty cycle value is in a different preset range. For a negative answer, operation block 49 becomes active, no gear change occurs, and the logic flows back to the start of the logic flow diagram 38.

Otherwise, operation block 50 becomes active, and the powertrain control module 24 sends a signal to the transmission 18 to change to the desired gear corresponding to the new percent duty cycle range. Following operation block 50, a check is made in inquiry block 52 as to whether the new desired gear has any secondary systems that require activation. Secondary systems include, for example, reverse lamps 26 when the desired gear is reverse, as discussed earlier. For a positive answer, operation block 54 becomes active and the powertrain control module 24 sends a signal to the required secondary system, as discussed earlier. Otherwise, the logic flows back to start of the logic flow diagram 38.

While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A method for operating a transmission system comprising:
   operating a gearshift;
   rotating a transmission manual shaft in response to operating said gearshift; generating a pulse-width modulated signal from a non-contacting transmission range sensor, said pulse-width modulated percent duty cycle signal varying in a proportional relationship to an angular position of said manual shaft gearshift relative to gearshift detent valleys and detent peaks; and
   receiving said pulse-width modulated percent duty cycle signal in a powertrain control module;
   determining, in said powertrain control module, said angular position of said gearshift by comparing said pulse-width modulated percent duty cycle signal to discrete duty cycle values preset in said powertrain control module; and
   operating vehicle functions in response to signals from said powertrain control module;
   operating a powertrain control module in response to said pulse-width modulated signal.

2. The method as recited in claim 1 wherein said step of operating said powertrain control module includes the step of checking for transmission system error.

3. The method as recited in claim 1 wherein said step of operating a powertrain control module includes the step of activating a solenoid.

4. The method as recited in claim 1 wherein said step of operating a powertrain control module includes the step of activating a reverse signal lamp when said pulse-width modulated signal is within a preset percent duty cycle for reverse.

5. An automobile range sensor system comprising:
   a control device gearshift;
   a shaft coupled to said control device;
   a non-contacting range sensor coupled to said shaft gearshift wherein said non-contacting range sensor generates a pulse-width modulated percent duty cycle signal in response to angular position of said shaft gearshift relative to gearshift detent valleys and detent peaks; and
   a control module electrically attached to said non-contacting range sensor, said control module adapted to receive
   said pulse-width modulated percent duty cycle signal, said control module further adapted to determine said angular position of said gearshift by comparing said pulse-width modulated percent duty cycle signal to discrete duty cycle values preset in said control module, and said control module operating vehicle functions in response to said angular position of said gearshift.

6. The system of claim 5 wherein said control module operates with discrete duty cycle values set for said vehicle components subject to control from said control module.

7. The system as recited in claim 6 wherein said discrete duty cycle values include set error states indicating non-contacting range sensor malfunction.

8. The system of claim 5 wherein said non-contacting range sensor is shielded from electromagnetic interference.

9. The system as recited in claim 5 wherein said non-contacting range sensor is a non-contacting transmission range sensor.

10. The system as recited in claim 5 wherein said control module is a powertrain control module.

* * * * *